(12) United States Patent
Choat

(10) Patent No.: US 8,369,996 B2
(45) Date of Patent: Feb. 5, 2013

(54) METHOD, APPARATUS, AND COMPUTER PROGRAM FOR IRRIGATING A FIELD SPACE WITH A CENTER PIVOT IRRIGATION MACHINE

(75) Inventor: Wayne D. Choat, St. Edward, NE (US)

(73) Assignee: Lindsay Corporation, Omaha, NE (US)

( * ) Notice: Subject to any disclaimer, the term of this patent is extended or adjusted under 35 U.S.C. 154(b) by 953 days.

(21) Appl. No.: 12/431,462

(22) Filed: Apr. 28, 2009

(65) Prior Publication Data

US 2010/0274398 A1 Oct. 28, 2010

(51) Int. Cl.
*G05D 11/00* (2006.01)

(52) U.S. Cl. ........... 700/284; 137/78.2; 239/63; 239/69; 239/170

(58) Field of Classification Search ............ 700/284; 137/78.2, 78.3; 239/63, 64, 69, 99, 170
See application file for complete search history.

(56) References Cited

U.S. PATENT DOCUMENTS

| | | | |
|---|---|---|---|
| 3,921,908 A | 11/1975 | Zimmerer | |
| 4,011,990 A | 3/1977 | Meis et al. | |
| 4,223,839 A | 9/1980 | Bleakney | |
| 4,227,648 A * | 10/1980 | Holloway et al. | 239/11 |
| 4,340,183 A | 7/1982 | Kegel et al. | |
| 4,432,494 A | 2/1984 | Hunter | |
| 4,569,481 A | 2/1986 | Davis et al. | |
| 4,674,681 A | 6/1987 | Meis et al. | |
| 5,341,995 A | 8/1994 | Leatch | |
| 5,695,129 A | 12/1997 | Korus | |
| 6,039,273 A | 3/2000 | Christensen | |
| 6,085,999 A | 7/2000 | Gerdes et al. | |
| 6,095,439 A * | 8/2000 | Segal et al. | 239/729 |
| 6,923,390 B1 | 8/2005 | Barker | |
| 6,938,842 B2 | 9/2005 | Choat et al. | |
| 7,311,275 B2 | 12/2007 | Korus | |
| 2004/0232261 A1 | 11/2004 | Choat et al. | |
| 2007/0267524 A1* | 11/2007 | Mack | 239/729 |

* cited by examiner

*Primary Examiner* — Mohammad Ali
*Assistant Examiner* — Sheela S Rao
(74) *Attorney, Agent, or Firm* — Hovey Williams LLP

(57) ABSTRACT

To allow for optimal uniform application of irrigation fluid in a field space outfitted with a center pivot irrigation machine having a main pipeline and an auxiliary or corner pipeline, the auxiliary pipeline is operable to both lead and lag the main pipeline as the main pipeline makes a progressive rotation in a single direction through the field space. In one embodiment a control system for the irrigation machine comprises a buried cable control system. In another embodiment a control system comprises a global positioning satellite control system. In a third embodiment a control system comprises at least two position sensing devices, a first device for sensing an angle of the main pipeline with respect to a center tower and a second device for sensing an angle between the main pipeline and the auxiliary pipeline, and a speed controlling device for controlling a speed of rotation of the main and auxiliary pipelines.

21 Claims, 5 Drawing Sheets

METHOD, APPARATUS, AND COMPUTER PROGRAM FOR IRRIGATING A FIELD SPACE WITH A CENTER PIVOT IRRIGATION MACHINE

TECHNICAL FIELD

Embodiments of the invention relate to large center pivot irrigation machines of the type utilized in watering crops in a field, and, more particularly, to a method, apparatus, and computer program for controlling an auxiliary pipeline of the irrigation machine to both lead and lag a main pipeline of the machine in a field space.

BACKGROUND AND SUMMARY

Center pivot agricultural irrigation machines commonly include a main pipeline supported at intervals on movable towers for rotation about a fixed, center point proximate to an inner, proximal end of the pipeline. Irrigation fluid is supplied to the proximal end of the pipeline and distributed through sprinklers or other fluid emitting devices placed along or supported from the pipeline. The movement of the main pipeline about the center pivot irrigates a circular portion of a field space, herein referred to as a primary field space. In a square-shaped or an irregularly-shaped field space, irrigation of only a circular portion of the field space leaves corners of the square field space or other irregular perimeter areas without irrigation.

In installations where additional productive capacity of the field space's corners or irregular perimeter areas is desired, these areas can be irrigated by adding at least one auxiliary pipeline adjacent a distal end of the main pipeline, commonly referred to as a corner unit. The auxiliary pipeline irrigates field space areas outside of the circular area, herein referred to as a secondary field space. The auxiliary pipeline is in fluid communication with and supplied by the distal end of the main pipeline. The auxiliary pipeline is capable of moving as needed to extend into the corners or other irregular areas by transitionally rotating about the distal end of the main pipeline as the main pipeline rotates about the center pivot.

In prior art center pivot irrigation machines, the auxiliary pipeline is operable to either lead ahead or lag behind the main pipeline, but not both, when the pipeline is rotating through the field space in a single direction. For a field space that allows for the main pipeline to rotate approximately 360°, the ability for the auxiliary pipeline to either lead or lag the main pipeline is usually not problematic. Regardless of whether the auxiliary pipeline is leading or lagging the main pipeline, the auxiliary pipeline is positioned to allow for uniform application coverage of the secondary field space because the main pipeline rotates a full 360° in the field space. However, in field spaces that are either partially circular, i.e., that do not allow for an approximately 360° rotation of the main pipeline in the field space, or that include boundaries or obstructions that do not optimally allow for the auxiliary pipeline to either lead or lag, but not both, the choice of either a leading or a lagging auxiliary pipeline is insufficient. As used herein, a partially circular field space is defined as any field space that does not allow for an approximately 360° rotation of the main pipeline in the field space. Therefore, partially circular field spaces include, for example, field spaces that allow the main pipeline to rotate approximately 90°, 180°, 270°, or even approximately 350°. It is to be expressly understood that embodiments of the present invention can be used for completely circular field spaces, and that such use would be advantageous in those instances where the field space includes boundaries or obstructions that would be optimally accounted for using the present invention.

More particularly, prior art auxiliary pipelines are programmed to either lead ahead or lag behind the main pipeline during progressive rotation of the main pipeline in a single direction through the field space. The angle of rotation of the auxiliary pipeline with respect to the main pipeline, known as the swing angle, is approximately 80°-170°. In partially circular field spaces, unlike in completely circular field spaces, the main pipeline commonly must reverse direction (i.e., begin moving counterclockwise if initially moving clockwise) because it cannot rotate a full 360° to a beginning position. If the auxiliary pipeline is operable to only lead or lag the main pipeline during progressive rotation of the main pipeline in a single direction, there will necessarily be a portion of the primary field space that remains unirrigated due to the auxiliary pipeline impinging on a boundary or obstruction of the field space.

FIG. 1 illustrates the above-described prior art problem in more detail, wherein an auxiliary pipeline 114 is operable to only either lead or lag a main pipeline 112 during progressive rotation of the main pipeline 112 in a single direction through a field space 138. FIG. 1 presents a field space that is generally rectangular and having north, south, east, and west boundary lines 90,92,94,96, respectively. The irrigation machine 110 has its center pivot positioned generally south-center in the field space 138. When the direction of rotation of the main pipeline 112 is clockwise, the auxiliary pipeline 114 is leading the main pipeline 112; conversely, when the direction of rotation of the main pipeline 112 is counterclockwise, the auxiliary pipeline 114 is lagging the main pipeline 112. Because the auxiliary pipeline 114 is leading the main pipeline 112 when the main pipeline 112 is along a southwest border 98 of the field space 138, the auxiliary pipeline 114 does not obstruct the main pipeline's ability to uniformly irrigate, as denoted at position A on FIG. 1. As the main pipeline 112 begins its clockwise rotation through a primary field space 140, the auxiliary pipeline 114 increases the swing angle from 90° at a general southwest corner 100 of the field space 138, to a swing angle of approximately 155° at a general west corner 102 of the field space, denoted as position B on FIG. 1. As the main pipeline 112 continues its rotation from the west corner 102 to a east corner 104, the auxiliary pipeline 114 tucks back in towards the main pipeline 112 so as to not impinge on the border 90 of the field space 138, which consequently decreases the swing angle of the auxiliary pipeline 114. Eventually, the main pipeline 112 rotates proximate a southeast corner 106 of the field space 138. However, because the auxiliary pipeline 114 is operable only to lead the main pipeline 112, the auxiliary pipeline 114 reaches a southeast border 108 of the field space 138 before the main pipeline 112 and does not allow the main pipeline 112 to rotate generally parallel to the south border 92, as denoted at position C on FIG. 1. Depending on the minimum swing angle between the main and auxiliary pipelines 112,114, at least a portion of the field space 138 is left unirrigated, which wastes available land.

The present invention solves the above-described problems and provides a distinct advance in the art of center pivot irrigation machines. More particularly, embodiments of the present invention provide an auxiliary pipeline operable to both lead and lag a main pipeline of a center pivot irrigation machine during progressive rotation of the main pipeline in a single direction through a field space. To accomplish both the leading and lagging with respect to the main pipeline, the auxiliary pipeline is operable to rotate at least approximately 0° and up to 360° with respect to the main pipeline. The only restriction on the minimum and maximum swing angles and within a 0°-360° rotation is a size of trusses mounted on the main and auxiliary pipelines and the prevention of the respective trusses colliding with each other.

BRIEF DESCRIPTION OF THE DRAWINGS

Embodiments of the present invention are described in detail below with reference to the attached drawing figures, wherein.

DETAILED DESCRIPTION

The present invention is susceptible of embodiment in many different forms. While the drawings illustrate and the specification describes certain embodiments of the invention, it is to be understood that such disclosure is by way of example only. There is no intent to limit the principles of the present invention to the particular disclosed embodiments.

Figure 1:
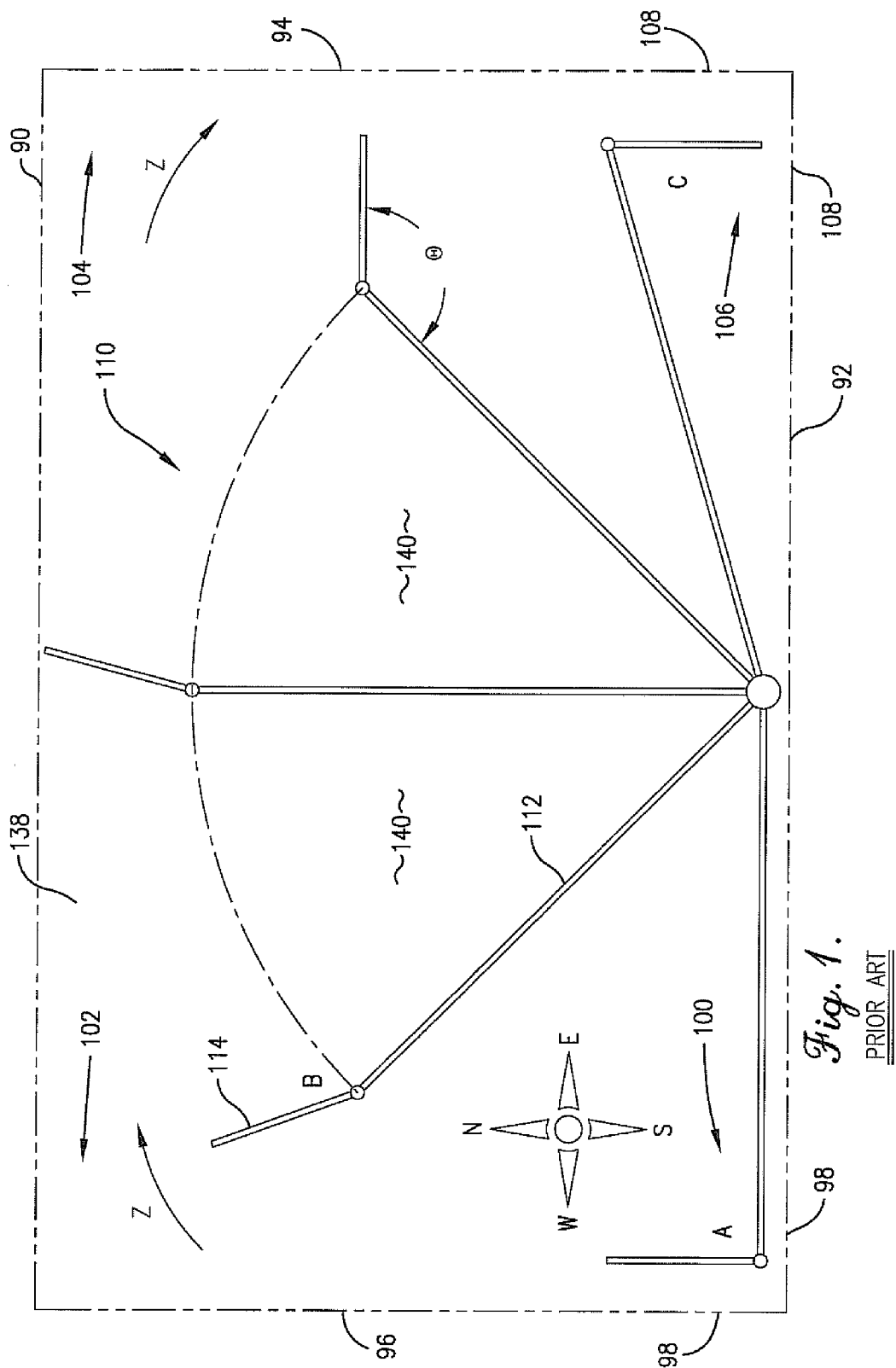
FIG. 1 is a schematic plan view of an exemplary field space irrigated by a prior art irrigation machine, wherein an auxiliary pipeline of the machine is configured for only leading or lagging a main pipeline of the machine.
Figure 2:
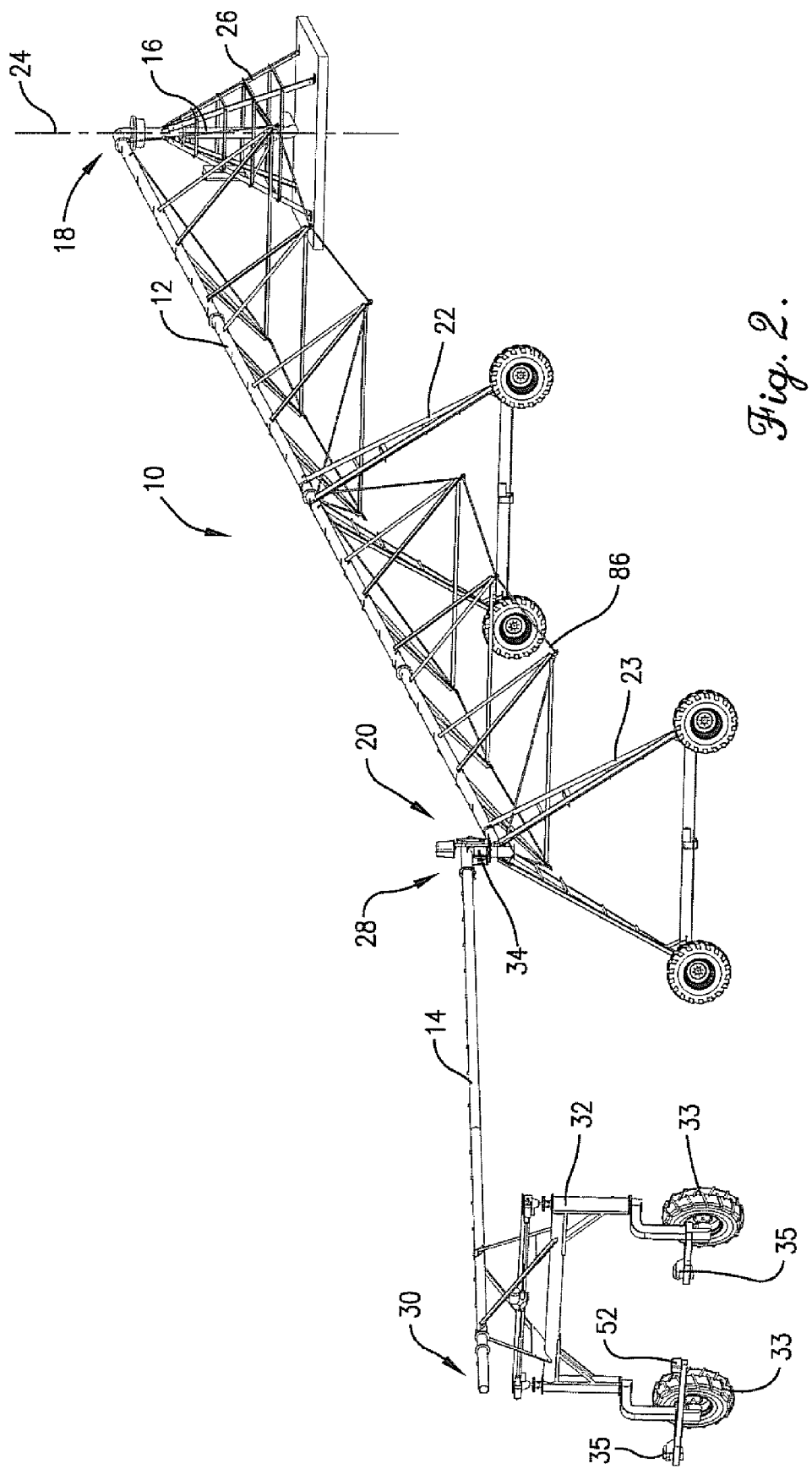
FIG. 2 is an isometric view of an irrigation machine of embodiments of the present invention and illustrating a main pipeline and an auxiliary pipeline.

As illustrated in FIG. 2, a center pivot irrigation machine 10 of embodiments of the present invention comprises a long conduit or main pipeline 12 and a shorter auxiliary pipeline 14, also referred to as a corner unit. Both pipelines 12,14 are configured for carrying irrigation fluid, such as water and/or fertilizer, herbicide, insecticide, or other similar product, which is supplied to the main pipeline 12 via a supply pipeline 16 connected to a water source (not shown).

The main pipeline 12 includes proximal and distal ends 18,20 and is supported at spaced locations along its length by a plurality of mobile, self-propelled towers 22. The proximal end 18 of the main pipeline 12 is adapted to pivot about an upright axis 24 of a center, fixed tower 26, which serves as a center point. Various types of sprinklers or emitters (not shown) are typically provided along a length of the main pipeline 12 for directing the irrigation fluid onto the ground in the vicinity of machine 10.

Figure 3:
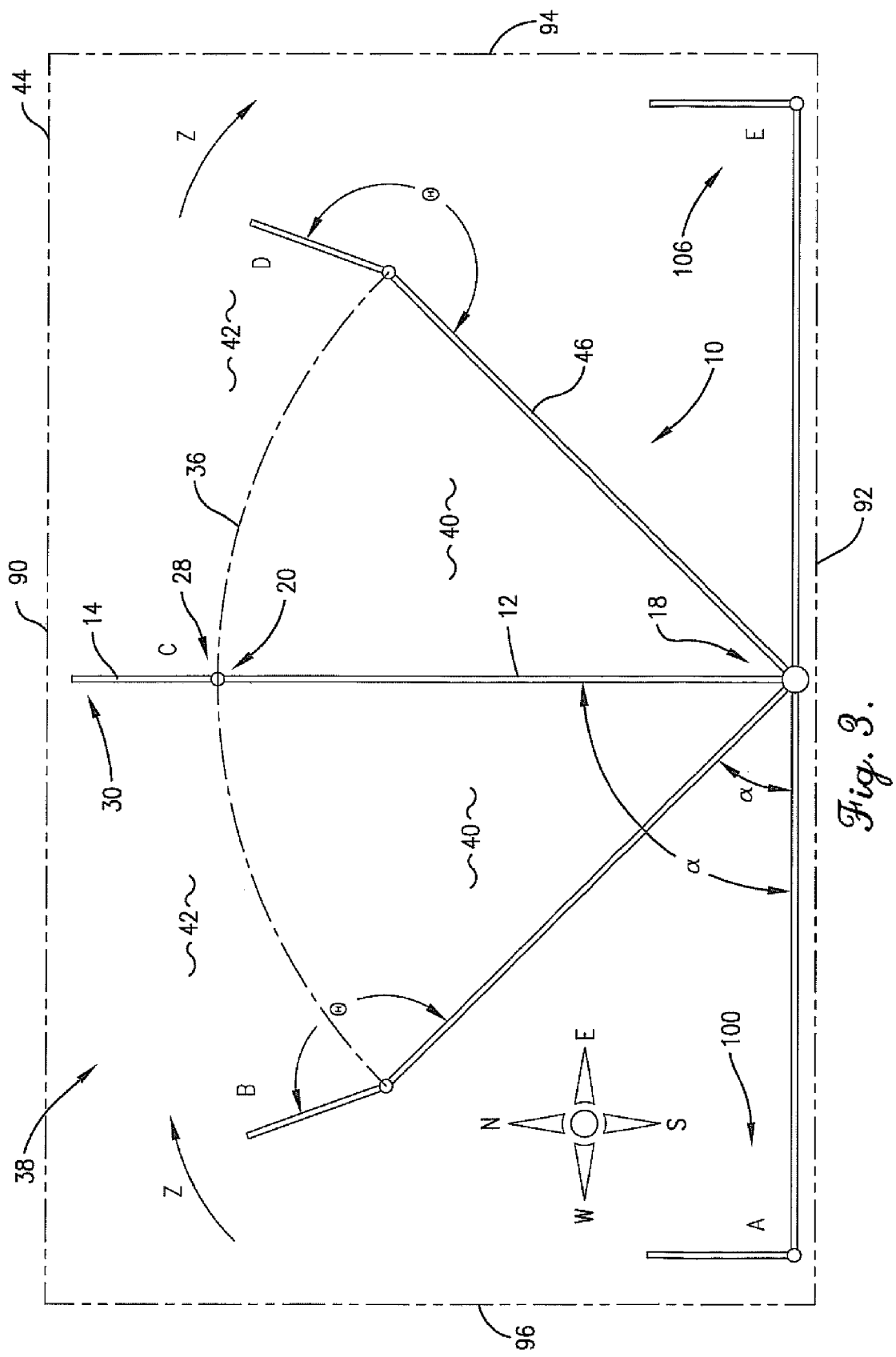
FIG. 3 is a schematic plan view of an exemplary field space irrigated by the irrigation machine of embodiments of the present invention.

Referring to FIGS. 2 and 3, the auxiliary pipeline 14 includes proximal and distal ends 28,30, and the general proximal end 28 of the auxiliary pipeline 14 is coupled with the distal end 20 of the main pipeline 12 via a coupling assembly 34 mounted on an end tower 23. A steerable auxiliary tower 32 is located at the general distal end 20 of the auxiliary pipeline 14 and includes at least one steerable, pivotable wheel 33 and a corresponding motor 35. The wheels 33 of the tower 32 may be driven by the motor 35 and controlled by a control system, described in more detail below. The auxiliary pipeline 14 receives irrigation fluid from the main pipeline 12 for distribution through a plurality of auxiliary emitters (not shown) spaced along the auxiliary pipeline 14. As discussed in more detail below, the auxiliary pipeline 14 is operable to pivot or otherwise rotate about the distal end 20 of the main pipeline 12 an angle θ, as illustrated in FIG. 3.

As illustrated in the schematic of FIG. 3, the distal end 20 of the main pipeline 12 describes at least a portion of a circle 36 as it moves clockwise in the direction of arrow Z through a field space 38. The area underneath the described portion of the circle defines a primary field space 40. Similarly, the distal end 30 of the auxiliary pipeline 14 describes an irregular outer boundary. The area between the boundary and the described portion of the circle is defined as a secondary field space 42. The auxiliary emitters (not shown) distribute fluid primarily to the secondary field space 42. A nominal property boundary 44 is also illustrated and includes north, south, east, and west borders 90,92,94,96, respectively. As can be appreciated, the irregular outer boundary actually described by the auxiliary pipeline 14 will be different for each field space 38.

As discussed herein and for ease of reference, the movement of the main pipeline 12 with respect to the primary field space 40 will always be clockwise (in the direction of arrow Z), although in operation, the main pipeline 12 is, of course, operable to move counterclockwise as well. Additionally, the angle θ of the auxiliary pipeline 14 to the main pipeline 12, also referred to as the swing angle, will be measured with respect to a right-hand side 46 of the main pipeline 12 when viewed in the plan view of FIG. 3. Thus, in the plan view, the proximal end 18 of the main pipeline 12 will be south of the auxiliary pipeline 14. It should be understood that other orientations or frames of reference could be used, and the above-discussed orientation is provided only for ease of reference herein.

Figure 6:
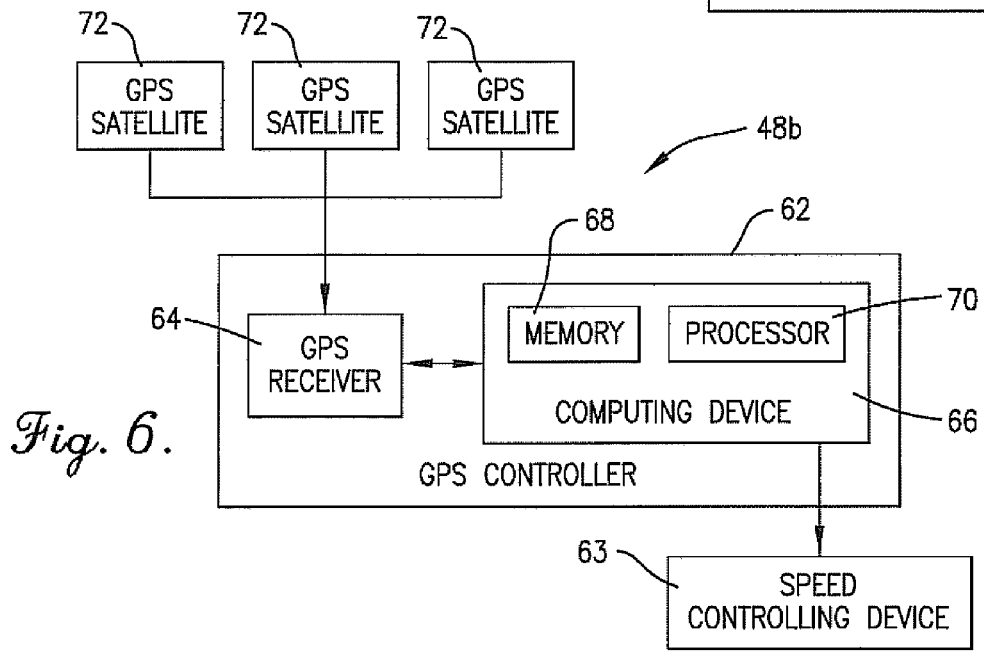
FIG. 6 is a block diagram of a global positioning satellite control system of embodiments of the present invention.
Figure 7:
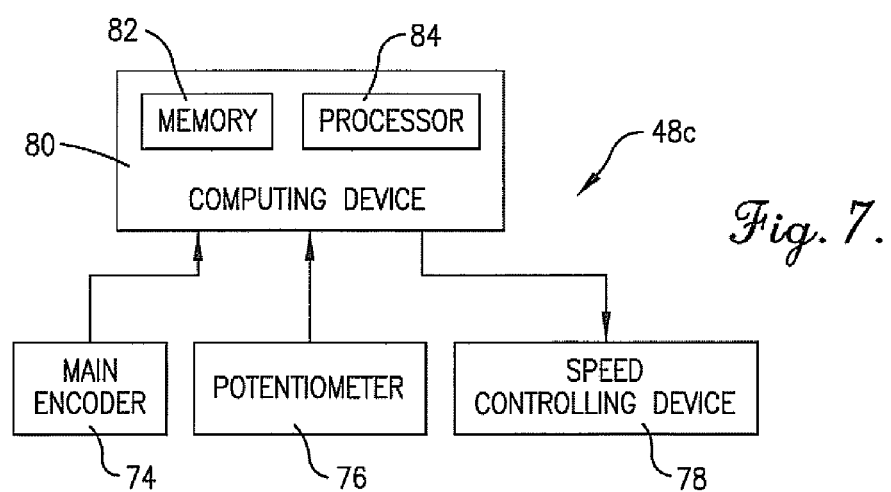
FIG. 7 is a block diagram of an encoder control system of embodiments of the present invention, The drawing figures do not limit the present invention to the specific embodiments disclosed and described herein. The drawings are not necessarily to scale, emphasis instead being placed upon clearly illustrating the principles of the invention.

Control and positioning of the auxiliary pipeline 14 can be accomplished using various control systems 48, such as a buried cable control system 48a (FIG. 5), a global positioning satellite ("GPS") control system 48b (FIG. 6), or an encoder control system 48c (FIG. 7). Each of these systems 48 is described below, although it should be understood that embodiments of the present invention may utilize one or more of the systems 48 depending on the field space characteristics, such as boundary shape and obstructions, cost, location of the field space 38, and other similar parameters.

Figure 4:
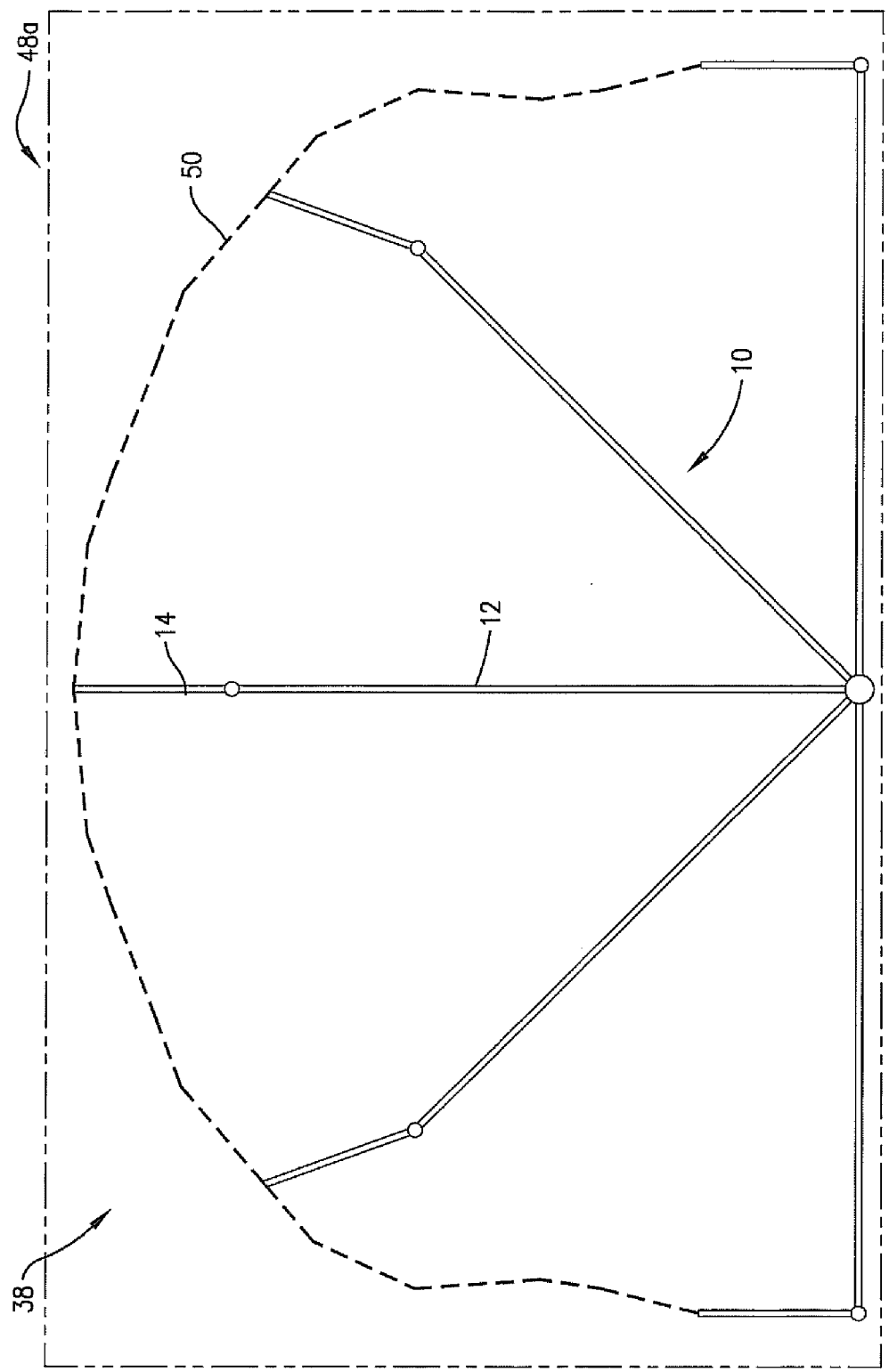
FIG. 4 is a schematic plan view of an exemplary field space irrigated using a buried cable control system of embodiments of the present invention.
Figure 5:
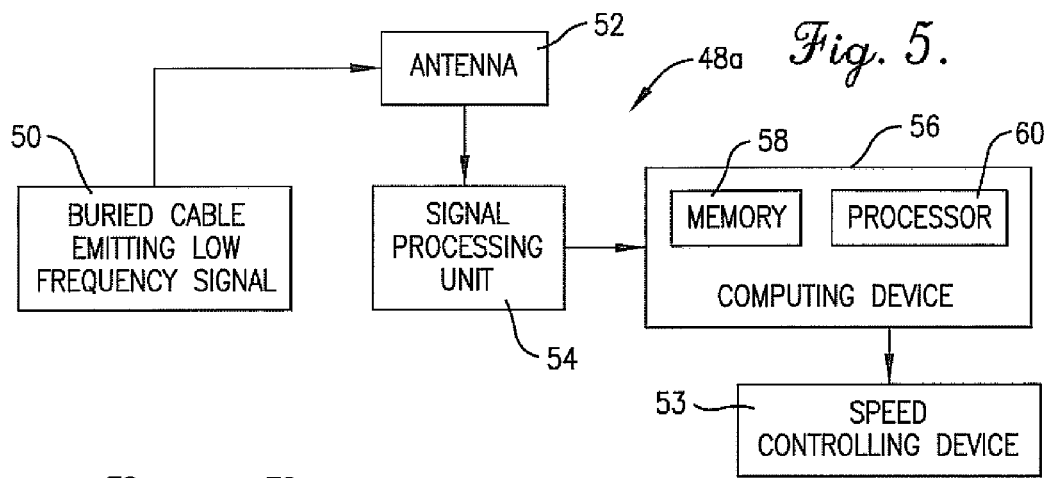
FIG. 5 is a block diagram of the buried cable control system of embodiments of the present invention.

In the buried cable system 48a, the path of the auxiliary pipeline 14, illustrated in FIG. 4, is fixed using a cable 50 buried along a preferred path of the auxiliary pipeline 14. Referring to FIG. 5, the buried cable system 48a comprises the buried cable 50 operable to emit a low frequency signal; an antenna 52 mounted on the auxiliary tower 32 and operable to receive the low frequency signal; a signal processing unit 54 coupled with the antenna 52 and operable to process the signal received by the antenna 52; at least one speed controlling device 53 operable to control a speed of the main and auxiliary pipelines 12,14; and a computing device 56 including a processor 60 and a memory 58 and coupled with the signal processing unit 54, the auxiliary pipeline 14 for controlling movement of the pipeline 14, and the speed controlling device 53. Alternatively, the signal processing unit 54 and the computing device 56 may be a single unit.

In more detail, the buried cable 50 emits the low frequency signal that is received by the antenna 52 and the signal processing unit 54 mounted to the irrigation machine 10, usually on the auxiliary tower 32. The auxiliary pipeline 14 then follows the path of the buried cable 50, such that the path of the auxiliary pipeline 14 substantially mimics the path of the buried cable 50. The computing device 56 is preferably programmable with a defined routine and is operable to instruct the main and auxiliary pipelines 12,14 to execute the routine and to control the speed of the pipelines 12,14 via the speed controlling device 53.

In other embodiments of the present invention, the GPS system 48b (FIG. 6) may be used to control positioning of the auxiliary pipeline 14. In the GPS system 48b, an independent UPS controller 62 is positioned at or near the auxiliary tower 32 and includes a UPS receiver 64 and a computing device 66 including a processor 70 and a memory 68. The UPS receiver 64 may be positioned at either of the proximal or distal ends 28,30 of the auxiliary pipeline 14, depending on whether the GPS receiver 64 is housed with the GPS controller 62. The computing device 66 is coupled with the GPS receiver 64 for controlling operation and positioning of the auxiliary pipeline 14 with respect to the main pipeline 12. Additionally, the computing device 66 is coupled with a speed controlling device 63 operable to control a speed of the main and auxiliary pipelines 12,14. The GPS receiver 64 is operable to receive satellite signals from a plurality of GPS satellites 72, and the computing device 66 is operable to determine a current location of the auxiliary tower 32 as a function of the received satellite signals. In alternative embodiments of the present invention, the GPS receiver 64 and computing device 66 are a single unit.

In more detail, the computing device 66 receives current location readings from the GPS receiver 64, compares the location readings to known reference positions, and then begins a first prescribed positioning of the auxiliary pipeline 14 when the current location reading matches a first known reference position and begins a second prescribed positioning when the current location reading matches a second known reference position. Moreover, the computing device 66 is preferably programmable with a defined routine and is operable to instruct the main and auxiliary pipelines 12, 14 to execute the routine and to control the speed of the pipelines 12, 14 via the speed controlling device 63. An exemplary UPS system 48b is described in pending U.S. patent application Ser. No. 11/419,417, now U.S. Patent Application Publication 2007-0267524, assigned to Lindsay Manufacturing Company, the disclosure of which is hereby incorporated by reference in its entirety.

In even further embodiments of the present invention, the encoder system 48c (FIG. 7) is operable to measure the position of the main and auxiliary pipelines 12,14 relative to a 360° circle in the field space 38. The encoder system 48c of embodiments of the present invention comprises a main encoder 74 or other position sensing device coupled with the center, fixed tower 26; a potentiometer 76 or other position sensing device coupled with the end tower 23; at least one speed controlling device 78 operable to control a speed of the main and auxiliary pipelines 12,14; and a computing device 80 including a processor 84 and a memory 82. The computing device 80 is coupled with the main encoder 74, the potentiometer 76, and the speed controlling device 78 and is operable to receive information from the same and instruct the irrigation machine 10 according to a defined, programmed routine as a function of the received information. An exemplary encoder 74 according to embodiments of the present invention is sold by Renishaw, Inc., Position Sensor Part No. RE58A10KIT01. An exemplary potentiometer 76 according to embodiments of the present invention is sold under the brand name "CLAROSTAT," Part No. 53C1-2.5K.

The main encoder 74 is operable to measure a center pivot angle α and the potentiometer is operable to measure the swing angle, i.e., the angle θ between the main and auxiliary pipelines 12,14. The speed of the main and auxiliary pipelines 12,14 is monitored and controlled with the speed controlling device 78. The main encoder 74, the potentiometer 76, and the speed controlling device 78 are coupled with the computing device 80 and are operable to be controlled by the computing device 80. Based on a known speed of the main and auxiliary pipelines 12,14 and the center pivot and swing angles, a general location of the main and auxiliary pipelines 12,14 in the field space 38 can be determined at all times. As can be appreciated, in alternative embodiments of the present invention, the encoder system 48c might use a combination of encoders, potentiometers, or other position sensing devices to measure both the center pivot angle and the swing angle.

The computing device 80 of the encoder system 48c of embodiments of the present invention can be any computing device 80 operable to receive angle and speed information from the main encoder 74, the potentiometer 76, and the speed controlling device 78 and provide instructions to same. Moreover, the computing device 80 is preferably programmable with a defined routine and is operable to instruct the main and auxiliary pipelines 12,14 to execute the routine.

The processors 60, 70, 84 of the computing devices 56,66, 80 may implement a computer program that performs at least some of the functions described herein. In embodiments of the present invention, the computer program comprises an ordered listing of executable instructions or code segments for implementing logical functions. The computer program can be embodied in any computer-readable medium for use by or in connection with an instruction execution system, apparatus, or device, and execute the instructions. As used herein, a "computer-readable medium" can be any structure that can contain, store, communicate, propagate, or transport the computer program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium include the following: an electrical connection having one or more wires, a random access memory (RAM), a read-only memory (ROM), an erasable, programmable, read-only memory (EPROM or Flash memory), a portable computer diskette, and a portable compact disk read-only memory (CDROM).

The processors 60, 70, 84 may include microprocessors, microcontrollers, programmable intelligent computers (PICS), or similar devices. The processors 60, 70, 84 may also include field-programmable gate arrays (FPGAs) or other programmable logic devices (PLDs), fully-custom or semi-custom application-specific integrated circuits (ASICs), or any other device that is described by one or more code segments of a hardware description language (HDL). Further, the processors 60, 70, 84 may include combinations of any of the above-listed components.

The memories 58, 68, 82 of the computing devices 56,66, 80 generally store information for the operation of the irrigation machine 10. The memories 58, 68, 82 may store programming information for one or more individual mappings or routines of the irrigation machine 10 in the field space 38 or customized programming settings that may be entered in real time if minor adjustments are desired to be made. The memories 58, 68, 82 may include, for example, removable and non-removable memory elements such as random-access memory (RAM), read-only memory (ROM), flash, magnetic, optical, universal serial bus (USB) memory devices, and/or other conventional memory elements, such as hard-disk drives.

It is also contemplated that the computing devices 56,66,80 of embodiments of the present invention are operably connected to a remote computing device (not shown) for review of irrigation machine 10 activity, control or providing of instructions to the irrigation machine 10, receipt of information regarding the irrigation machine 10, or any other desired activity relating to the operation of the irrigation machine 10. In embodiments of the present invention, each computing device 56,66,80 is operable to access a conventional Internet connection or other communications network (not shown), such as a local area network, a wide area network, a wireless network, or an intranet.

The computing devices 56,66,80 can be programmed with the defined routine for the irrigation machine 10. In embodiments of the present invention, an installer of the irrigation machine 10 undertakes a mapping rotation of the machine 10 that takes a plurality of individual position readings of the field space 38, often upwards of a thousand or more individual readings. The individual position readings are then used to develop the routine for the particular field space 38 that accomplishes an optimized, uniform application pattern of the irrigation fluid. In most routines that optimize application patterns, the main pipeline 12 will irrigate a majority of the primary field space 40, and the auxiliary pipeline 14 will irrigate a majority of the secondary field space 42. As can be appreciated, the defined routine will vary, sometimes significantly, depending on the particular field space 38, including boundaries and obstructions.

It is to be understood, however, that the defined routine also encompasses "on the fly" or generally simultaneous instruction of the routine by an operator, installer, or other person controlling the machine 10 as the machine 10 moves through the field space 38. Therefore, the controller of the machine 10 may instruct the defined routine generally immediately prior to the machine 10 actually performing the routine.

In even further alternative embodiments of the present invention, the defined routine may be any routine that is performed by a smart machine 10. An exemplary smart machine is any machine 10 operable to determine its location within the field space 38 and constantly reevaluate where it is and should be moving. In such a machine 10, the defined routine need not be programmed in a memory, but instead may be determined by the machine 10 as the machine moves through the field space 38.

In embodiments of the present invention, the swing angle θ for the auxiliary pipeline 14 is not limited to approximately 80°-170°, as in the prior art. Instead, the auxiliary pipeline 14 is operable to rotate at least approximately 0° and up to approximately 360° with respect to the main pipeline 12. The only restriction on the minimum and maximum swing angles and within a 0°-360° rotation of the auxiliary pipeline 14 is a size of trusses 86 mounted on the main and auxiliary pipelines 12,14 (not shown on the auxiliary pipeline 14) and the prevention of the respective trusses 86 colliding with each other. Thus, a more practical range for the swing angle, given common truss width, is approximately 15°-345°.

The auxiliary pipeline's ability to rotate 0°-360° with respect to the main pipeline 12 during the main pipeline's progressive rotation in a single direction through the field space 38 is referred to herein as the ability to both lead and lag the main pipeline 12. In a clockwise direction, "leading" of the auxiliary pipeline 14 with respect to the main pipeline 12 is defined a swing angle less than 180°. Further in a clockwise direction, "lagging" of the auxiliary pipeline 14 with respect to the main pipeline 12 is defined as a swing angle greater than 180°. Similarly, in a counterclockwise direction, "leading" of the auxiliary pipeline 14 with respect to the main pipeline 12 is defined as a swing angle greater than 180°. Further in a counterclockwise direction, "lagging" of the auxiliary pipeline 14 with respect to the main pipeline 12 is defined as a swing angle less than 180°. A swing angle of 180° is neither leading nor lagging but is instead defined as "center" of the main pipeline 12. The ability of the auxiliary pipeline 14 to both lead and lag the main pipeline 12 is also referred to herein as the auxiliary pipeline's ability to "go over center" of the main pipeline 12, i.e., to cross a virtual line extending from the distal end 20 of the main pipeline 12.

It should also be appreciated that setting the swing angle at 180° when the auxiliary pipeline 14 is center of the main pipeline 12 is only a frame of reference, and that such angle could be set, for example, at 0°. In such case, a leading auxiliary pipeline 14 would have a swing angle greater than 0°, and a lagging auxiliary pipeline 14 would have a swing angle less than 0°.

In operation, the auxiliary pipeline 14 rotates about the main pipeline 12 generally continuously through the field space 38, although there may be areas in the field space 38 where rotation of the auxiliary pipeline 14 is temporarily halted. As the main pipeline 12 makes its progressive rotation in a single direction through the primary field space 40, the auxiliary pipeline 14 is operable to transitionally rotate to both leading and lagging positions with respect to the main pipeline 12 in accordance with an optimized application pattern for the particular secondary field space 42. As can be appreciated, the exact positioning of the auxiliary pipeline 14 in a particular field space is largely dependent on field space characteristics, such as size, obstructions, and boundaries, the main pipeline 12 size, and emitter patterns and rates of application.

As used herein, "progressive rotation in a single direction" of the main pipeline 12 is intended to encompass several different types of operational periods. In a first type of operational period, the main pipeline 12 is generally continuously rotating in a single direction, i.e., either clockwise or counterclockwise, and emitting irrigation fluid. In a second type of operational period, movement and emission of fluid of the main pipeline 12 and the auxiliary pipeline 14 are stopped for a period of time, and then movement (in the same direction) and emission of the pipelines 12,14 resumes. Alternatively, movement of the main and auxiliary pipelines 12,14 are stopped, but the main pipeline 12 continues to emit fluid while stopped, but the auxiliary pipeline 14 does not emit fluid. In alternative operational periods, the main pipeline 12 may reverse and then resume movement in a particular direction. For example, the main pipeline 12 may move clockwise for a particular period of time, then reverse movement and move counterclockwise for a particular period of time, and then again reverse movement and move clockwise for a particular period of time. In such a case, the main pipeline 12 is actually undergoing several progressive rotations in a single direction, with each change in the direction of movement being a different progressive rotation in a single direction.

As illustrated in the field space schematic of FIG. 3, the auxiliary pipeline 14 transitions from an approximate 90° swing angle at a general southwest corner 100, denoted at position A; to an approximate 155° swing angle at position B; to an approximate 180° swing angle at position C; to an approximate 205° swing angle at position D; and finally, to an approximate 270° swing angle at a general southeast corner 106, denoted at position E. During the progressive rotation of the main pipeline 12 through the field space 38 in a clockwise direction, the auxiliary pipeline 14 transitions from a leading position at A and B, to a center position at C, and to a lagging position at D and E. Thus, upon arriving at position E, the main pipeline 12 is generally parallel to the south border 92 of the field space boundary 44, which allows for complete irrigation of the southeast corner 106 of the field space 38.

It should be understood that the presented Figures illustrate exemplary field spaces, and that embodiments of the present invention can be used in multiple-shaped field spaces. As such, it may be that in one field space, for example, the auxiliary pipeline 14 extends to a 180° swing angle at the corners of the field space, and in another field space, the auxiliary pipeline 14 extends to a 180° swing angle only due. Furthermore, it may be that the auxiliary pipeline 14 is leading within a certain range of the field space 38, such as an approximate first half of the field space 38, and lagging within a second half of the field space 38. Additionally, and as discussed above, it may be that the auxiliary pipeline 14 is continually transitioning from a leading to a lagging position within the field space 38.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A method of providing fluid to a field space, the method comprising the steps of:
   providing a main pipeline of a center pivot irrigation machine for irrigating at least a portion of the field space, the main pipeline including—
      a proximal end configured to operably couple with and rotate about a center tower, and
      a distal end opposite the proximal end;
   providing an auxiliary pipeline of the center pivot irrigation machine for irrigating at least a portion of the field space, the auxiliary pipeline including—
      a proximal end configured to operably couple with and rotate about the distal end of the main pipeline, and
      a distal end opposite the proximal end; and
   providing a control system for instructing the auxiliary pipeline to rotate about the main pipeline as the main pipeline moves through the field space in accordance with a defined routine,
   said routine allowing the auxiliary pipeline to rotate about the main pipeline while the main pipeline is moving, such that an angle between the main pipeline and the auxiliary pipeline ranges from less than 180° to greater than 180° so that the auxiliary pipeline both leads and lags the main pipeline as the main pipeline makes a progressive rotation in a single direction through the field space.

2. The method of claim 1, wherein the center tower is fixed and serves as a center pivot for the main pipeline.

3. The method of claim 1, wherein the field space includes a primary field space and a secondary field space, said main pipeline moves through the field space in accordance with a defined routine, and said routine provides for the main pipeline to apply fluid to a majority of the primary field space and the auxiliary pipeline to apply fluid to a majority of the secondary field space.

4. The method of claim 1, wherein the auxiliary pipeline is operable to rotate at least approximately 0 and up to 360 with respect to the main pipeline so as to accomplish both the leading and lagging of the main pipeline.

5. The method of claim 1, wherein the control system includes a computing device that includes a memory and a processor, and the routine is stored in the memory.

6. The method of claim 5, further providing a buried cable control system for control of the auxiliary pipeline, the buried cable control system including—
   a buried cable operable to emit a low frequency signal,
   an antenna associated with the auxiliary pipeline and operable to receive the low frequency signal, and
   said computing device operable to process the signal and control operation of the auxiliary pipeline in accordance with the defined routine and as a function of the processed signal.

7. The method of claim 5, further providing a global positioning satellite ("GPS") system for control of the auxiliary pipeline, the GPS system including a GPS controller associated with the auxiliary pipeline, said controller including—
   a GPS receiver for receiving satellite signals from a plurality of GPS satellites, and
   said computing device for determining a current location of the auxiliary pipeline as a function of the received satellite signals.

8. The method of claim 5, further providing an encoder system for control of the auxiliary pipeline, the encoder system including—
   a first position sensing device proximate the proximal end of the main pipeline and operable to determine an angle of the main pipeline with respect to the center tower,
   a second position sensing device proximate the proximal end of the auxiliary pipeline and operable to determine an angle between the main pipeline and the auxiliary pipeline,
   at least one speed controlling device for controlling a speed of the main and auxiliary pipelines, and
   said computing device operably coupled with the first and second position sensing devices and the speed controlling device and operable to receive information from at least the first and second position sensing devices and instruct the auxiliary pipeline according to said defined routine as a function of the received information.

9. A method of providing fluid to a field space using a center pivot irrigation machine including a main pipeline and an auxiliary pipeline for respective irrigation of at least a portion of the field space, said main pipeline having a proximal end configured to operably couple with and rotate about a center tower and a distal end opposite the proximal end, said auxiliary pipeline having a proximal end configured to operably couple with and rotate about the distal end of the main pipeline and a distal end opposite the proximal end, the method comprising the step of:
   controlling the auxiliary pipeline to rotate about the main pipeline as the main pipeline moves through the field space in accordance with a defined routine,
   said routine allowing the auxiliary pipeline to rotate about the main pipeline while the main pipeline is moving, such that an angle between the main pipeline and the auxiliary pipeline ranges from less than 180° to greater than 180° so that the auxiliary pipeline both leads and lags the main pipeline as the main pipeline makes a progressive rotation in a single direction through the field space.

10. An irrigation machine for applying fluid to a field space, the irrigation machine comprising:
   a main pipeline for applying fluid to at least a portion of the field space, the main pipeline including—
      a proximal end configured to operably couple with and rotate about a center tower, and
      a distal end opposite the proximal end;

an auxiliary pipeline for applying fluid to at least a portion of the field space, the auxiliary pipeline including—
a proximal end configured to operably couple with and rotate about the distal end of the main pipeline, and
a distal end opposite the proximal end; and
a computing device programmed with a defined routine for instructing rotation of the auxiliary pipeline about the main pipeline as the main pipeline moves through the field space,
said routine allowing the auxiliary pipeline to rotate about the main pipeline while the main pipeline is moving, such that an angle between the main pipeline and the auxiliary pipeline ranges from less than 180° to greater than 180° so that the auxiliary pipeline both leads and lags the main pipeline as the main pipeline makes a progressive rotation in a single direction through the field space.

11. The irrigation machine of claim 10, wherein the center tower is fixed and serves as a center pivot for the main pipeline.

12. The irrigation machine of claim 10, wherein the field space includes a primary field space and a secondary field space, and said routine provides for the main pipeline to apply fluid to a majority of the primary field space and the auxiliary pipeline to apply fluid to a majority of the secondary field space.

13. The irrigation machine of claim 10, wherein the auxiliary pipeline is operable to rotate at least approximately 0 and up to 360 with respect to the main pipeline so as to accomplish both the leading and lagging of the main pipeline.

14. The irrigation machine of claim 10, wherein the computing device includes a memory and a processor, and the routine is stored in the memory.

15. The irrigation machine of claim 14, further including a buried cable control system for control of the auxiliary pipeline, the buried cable control system including—
a buried cable operable to emit a low frequency signal,
an antenna associated with the auxiliary pipeline and operable to receive the low frequency signal, and
said computing device operable to process the signal and control operation of the auxiliary pipeline in accordance with the defined routine and as a function of the processed signal.

16. The irrigation machine of claim 14, further including a global positioning satellite ("GPS") system for control of the auxiliary pipeline, the GPS system including a GPS controller associated with the auxiliary pipeline, said controller including—
a GPS receiver for receiving satellite signals fowl a plurality of GPS satellites, and
said computing device for determining a current location of the auxiliary pipeline as a function of the received satellite signals.

17. The irrigation machine of claim 14, further including an encoder system for control of the auxiliary pipeline, the encoder system including—
a position sensing device proximate the proximal end of the main pipeline and operable to determine an angle of the main pipeline with respect to the center tower,
a position sensing device proximate the proximal end of the auxiliary pipeline and operable to determine an angle between the main pipeline and the auxiliary pipeline,
at least one speed controlling device for controlling a speed of the main and auxiliary pipelines, and
said computing device operably coupled with the first and second position sensing devices and the speed controlling device and operable to receive information from at least the first and second position sensing devices and instruct the irrigation machine according to said defined routine as a function of the received information.

18. A computer program stored on a computer-readable medium for directing operation of a computing device to control a center pivot irrigation machine configured to apply irrigation fluid to a field space, said irrigation machine including a main pipeline operable to rotate through the field space about a center pivot and at the main pipeline's proximal end, and an auxiliary pipeline operable to rotate about a distal end of the main pipeline, the computer program comprising:
a code segment executable by the computing device for determining a location of the main pipeline within the field space and with respect to the center pivot;
a code segment executable by the computing device for determining a location of the auxiliary pipeline within the field space and with respect to the main pipeline; and
a code segment executable by the computing device for instructing the auxiliary pipeline to rotate about the main pipeline as the main pipeline moves through the field space in accordance with a defined routine and as a function of the location of the main and auxiliary pipelines,
said routine allowing the auxiliary pipeline to rotate about the main pipeline while the main pipeline is moving and providing for the auxiliary pipeline to both lead and lag the main pipeline as the main pipeline makes a progressive rotation in a single direction through the field space.

19. The computer program of claim 18, further including a code segment executable by the computing device for instructing the auxiliary pipeline to rotate at least approximately 0 and up to 360 with respect to the main pipeline so as to accomplish both the leading and lagging of the main pipeline.

20. The computer program of claim 19, further including a code segment executable by the computing device for instructing a control system of the irrigation machine, the control system including—
a first position sensing device proximate the proximal end of the main pipeline and operable to determine an angle of the main pipeline with respect to the center pivot,
a second position sensing device proximate the proximal end of the auxiliary pipeline and operable to determine an angle between the main pipeline and the auxiliary pipeline,
at least one speed controlling device for controlling a speed of the main and auxiliary pipelines, and
said computing device including a processor and a memory, wherein said defined routine is stored on the memory.

21. The computer program of claim 19, further including—
a code segment executable by the computing device for receiving information from the first and second position sensing devices and the speed controlling device, and
a code segment executable by the computing device for instruct the irrigation machine according to said defined routine as a function of the received information.

* * * * *